W. KIRKWOOD.
MEANS FOR FLUXING AND SUPPLYING SOLDER.
APPLICATION FILED JAN. 18, 1909.

955,172.

Patented Apr. 19, 1910.

Witnesses
R. A. White
H. P. L. White

Inventor:
William Kirkwood
By Jno. G. Elliott Atty.

UNITED STATES PATENT OFFICE.

WILLIAM KIRKWOOD, OF CHICAGO, ILLINOIS.

MEANS FOR FLUXING AND SUPPLYING SOLDER.

955,172.  Specification of Letters Patent.  Patented Apr. 19, 1910.

Application filed January 18, 1909. Serial No. 472,822.

*To all whom it may concern:*

Be it known that I, WILLIAM KIRKWOOD, a citizen of the United States, and a resident of Chicago, in the county of Cook and State of Illinois, have invented certain new and useful Improvements in Means for Fluxing and Supplying Solder, of which the following is a full, clear, and exact specification.

This invention relates to improvements in means for fluxing and supplying solder for the purposes for which solder is commonly employed.

The object of my invention is a means by which solder and a flux therefor may be supplied to the surface or joint to be soldered thoroughly incorporated in quantity and proportion, and regulated at the will of the operator throughout the operation of soldering, and by means entirely within the control of one hand of the operator.

A further object of my invention is also to provide means by which solder may be supplied with a suitable flux and a predetermined necessary supply thereof may, if desired, be uniformly maintained.

With these ends in view, my invention consists in certain features of novelty in the construction, combination and arrangement of parts, by which the said objects and certain other objects hereinafter appearing are attained, all as fully described with reference to the accompanying drawings, and more particularly pointed out in the claims.

Figure 1:
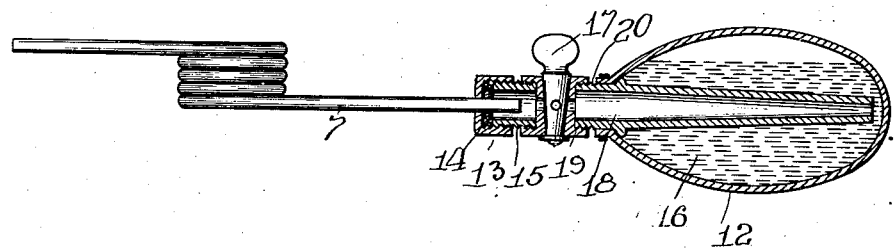
Figure 2:
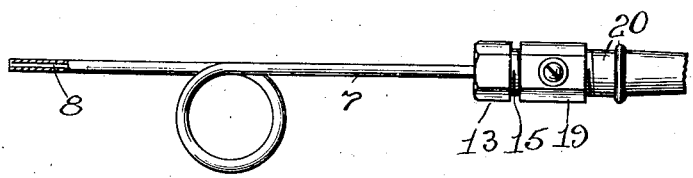
Figure 3:
Figure 4:
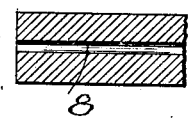
Figure 5:
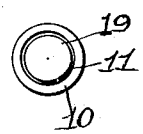
Figure 6:
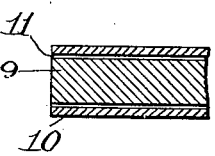

In said drawings: Figure 1 represents means partly in elevation and in section containing my invention. Fig. 2 is a detail elevation showing the means by which the solder may be connected with a suitable source of supply of flux. Fig. 3 is an end elevation of a form of solder embodying my invention. Fig. 4 is a detail longitudinal section thereof. Fig. 5 is an end elevation of a species of the means for conducting a shifting or flowing column of flux to the melting end of the solder. Fig. 6 is a detail longitudinal section thereof.

Similar characters of reference indicate the same parts in the several figures of the drawings.

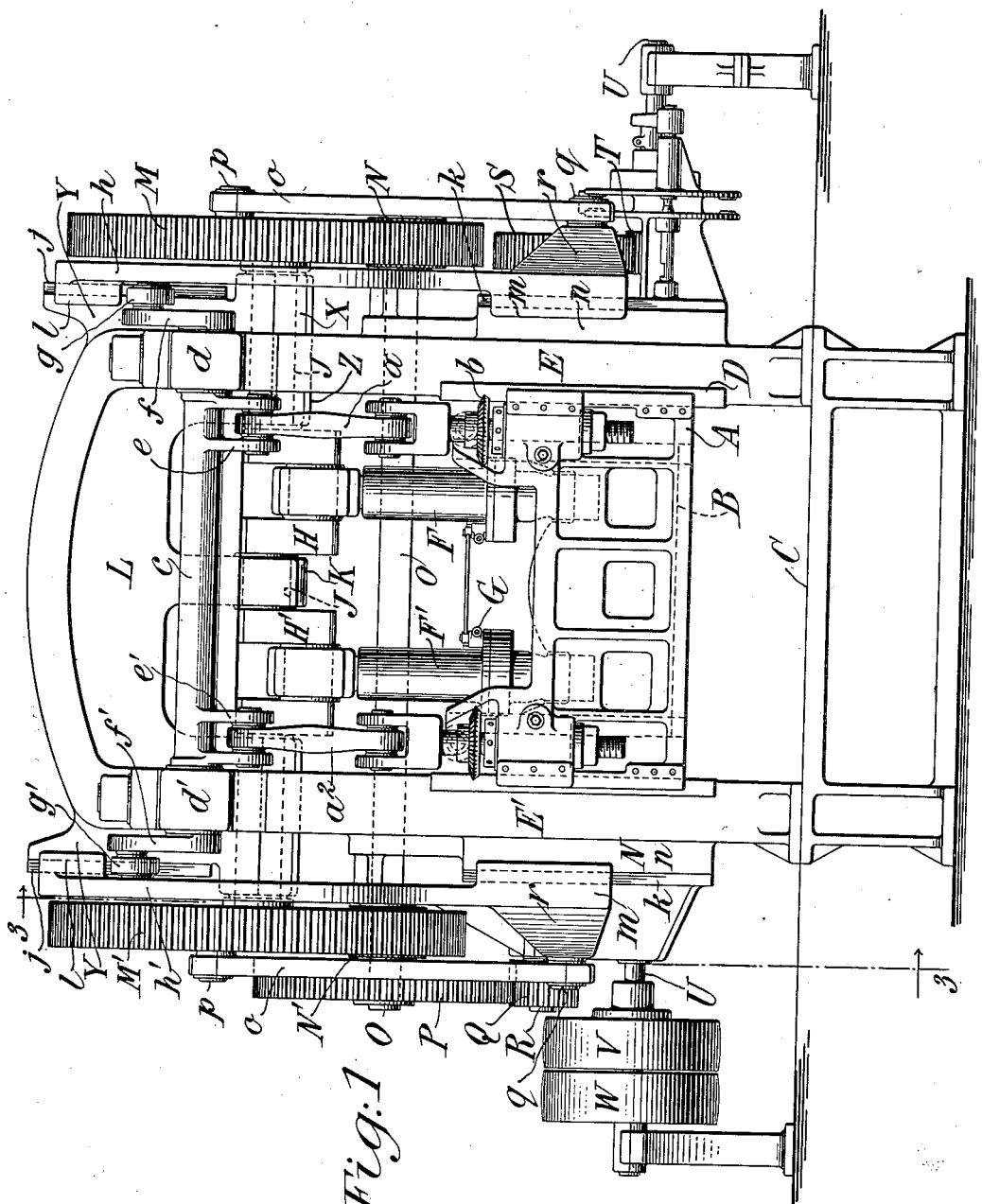

The solder wire or bar of my invention is preferably cylindrical in form as indicated at 7, but whether or not it is circular or angular in cross section it is provided with a longitudinal passage 8 therethrough which may be, and preferably is, formed when drawing the solder into lengths, and for the reason that it does not add anything to the cost of reducing it to the desired form. The diameter of this passage is sufficient for conducting therethrough a liquid flux, and if desired for the passage of a dry flux contained in a suitable receptacle of such a character that it may be forced through the passage in the wire or bar of solder by either mechanical means or by air pressure or by any suitable device adapted to be connected with and discharge the liquid or powder through and out the free end of a solder wire or bar, while the solder is being applied, to the article being soldered, by means of a heated soldering iron or flame directed on the article. As shown in the drawings the solder is in the form of a wire with a passage therethrough for the flux, and for the purposes of compactness is coiled with the free end projecting tangentially from the coil for convenience in use, the solder wire being partly uncoiled from time to time as may be necessary from shortening its tangentially projecting end from use. Instead, however, of a passage inside of the solder wire, as shown in Figs. 2, 3 and 4, such wire or bar may be solid, as shown at 19 in Figs. 5 and 6, and inclosed by a tube 10, the inside diameter of which is sufficiently greater than that of the solder wire or bar, to provide a passage 11 between the solder and the tube which passage may substantially surround the solder or be confined to one side thereof, the surrounding tube being of a metal which will fuse under the soldering iron and preferably of a metal fusing at as low or lower degree of heat than the solder, in order that the solder may not melt faster and its melting extend back into the surrounding tube, and to this end a solder of lower melting point is preferably employed, when, for example, a soft solder is employed and to the employment of which my invention is particularly directed. In other words, the tube may be of a solder differing in grade from that of the contents. In practice, it is preferred, however, to have the flux passage extend through the solder for the reason that such a passage is adaptable for the projecting of both a liquid and